United States Patent [19]
Anderson

[11] 3,731,798
[45] May 8, 1973

[54] SIZER CONVEYOR

[75] Inventor: Earl R. Anderson, Los Gatos, Calif.

[73] Assignee: Brex Corp. Trustee, Los Gatos, Calif.

[22] Filed: Dec. 28, 1970

[21] Appl. No.: 101,942

Related U.S. Application Data

[63] Continuation-in-part of Ser. No. 684,893, Nov. 6, 1967, abandoned.

[52] U.S. Cl. ................................................209/98
[51] Int. Cl. ............................................B07b 13/04
[58] Field of Search......................209/97, 98, 102, 209/106, 84

[56]      References Cited
            UNITED STATES PATENTS 2,917,170  12/1959  Flodin ..............................209/97 X

FOREIGN PATENTS OR APPLICATIONS 126,317  2/1945  Australia ..............................209/84
699,121  12/1965  Italy .....................................209/97

Primary Examiner—Richard A. Schacher
Attorney—Allen and Chromy

[57]         ABSTRACT

An endless series of grading elements are carried through a grading path and provide grading openings between each adjacent pair. Each grading element has parallel side walls joined by end surfaces and control cam means effect tilting of the respective elements to determine the size of the grading openings therebetween.

4 Claims, 9 Drawing Figures

Patented May 8, 1973

INVENTOR.
EARL R. ANDERSON

BY Allen and Krosny

ATTORNEYS

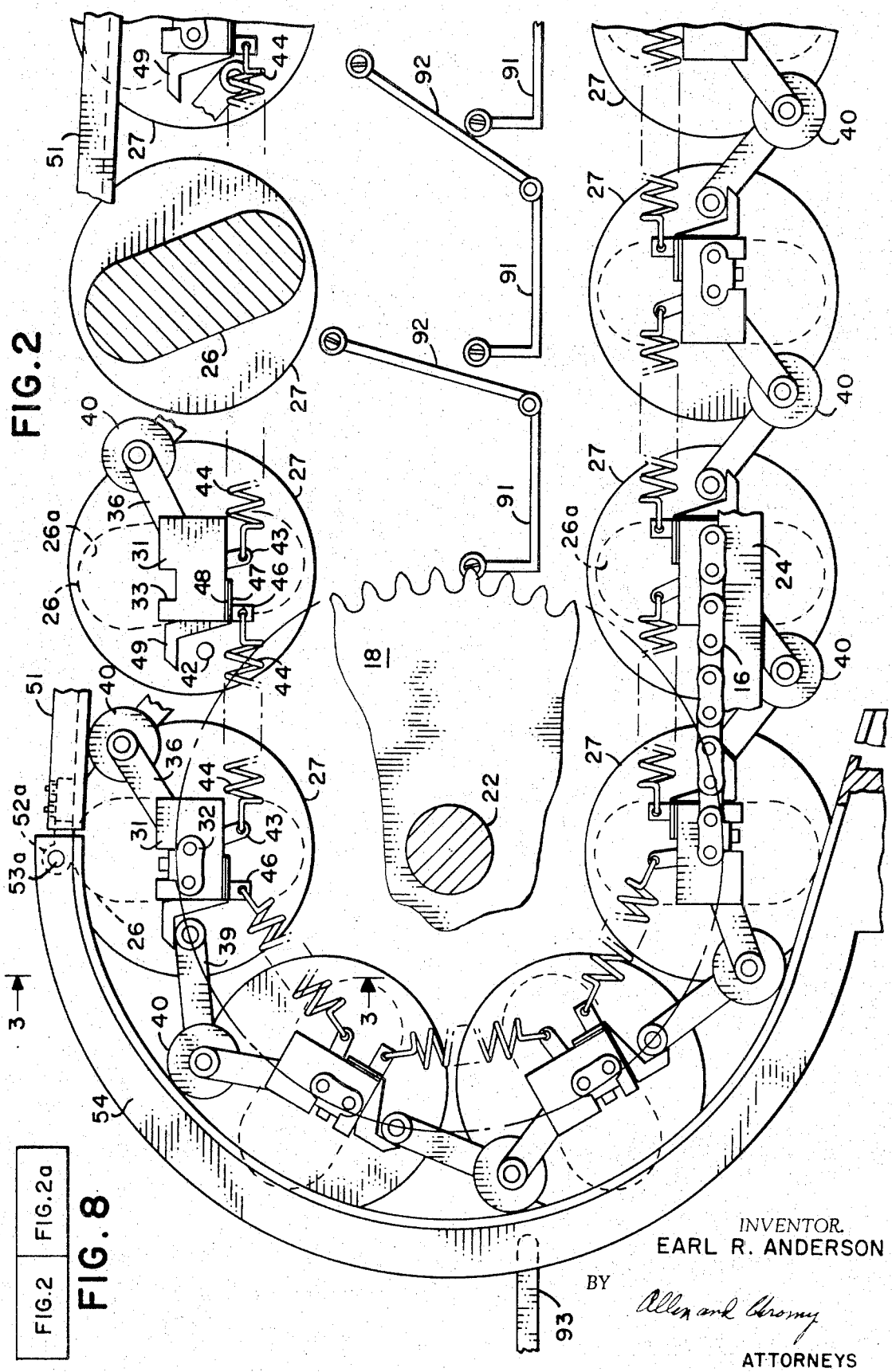

Patented May 8, 1973

INVENTOR.
EARL R. ANDERSON

BY
Allen and Chromy
ATTORNEYS

Patented May 8, 1973

INVENTOR.
EARL R. ANDERSON

BY *Allen and [signature]*

ATTORNEYS

Patented May 8, 1973

INVENTOR.
EARL R. ANDERSON

BY

ATTORNEYS

SIZER CONVEYOR

DESCRIPTION OF THE INVENTION

This application is a continuation-in-part application of my co-pending application Ser. No. 684,893 filed Nov. 6, 1967 for SIZER CONVEYOR, now abandoned.

This invention relates to a grading machine for articles such as fruit and vegetables in which means is provided for successively carrying grading elements through a path over respective troughs or conveyors for receiving graded articles of different sizes in accordance with relative tilting of the elements with respect to each other to control the size of the grading openings therebetween.

It is a general object of the invention to provide an improved grading machine for grading fruit and vegetable articles by size.

A further object of the invention is to provide a grading machine in which each space between a pair of adjacent grading elements provide a grading opening along the active grading path thereof.

A further object of the invention is to provide an improved grading machine in which a pair of adjacent grading elements provide a trough into which a transverse row of articles to be graded is deposited at the feed end of the machine so that the grading is effected row-by-row upon articles deposited therein.

A further object of the invention is to provide a grading element in which transverse rows of articles to be graded are carried along a path, and in which means are provided for feeding the grading apparatus row-by-row with articles to be graded.

Still another object of the invention is to provide a grading machine in which the grading elements are held resiliently in their adjusted position so as to avoid possible injury to fruit or vegetable articles being graded.

Still another object of the invention is to provide a shuffle feed mechanism in which a harmonic drive is provided in elevating fruit from a lower position to an upper position with the decreased speed of movement coming as it enters and leaves both of its end positions.

Other objects and advantages of the invention will be apparent from the following description of a preferred embodiment thereof taken in conjunction with the accompanying drawings, in which:

FIG. 1 is a perspective view of a grading machine employing the instant invention, certain parts being broken away to clarify the illustration of the parts;

FIGS. 2 and 2a comprise together a side elevational view of the grading conveyor, certain parts being broken away to show the different components and parts of the cam control means for determining the positioning of the various grading elements;

FIG. 4 is a fragmentary transverse sectional view of the shuffle feed mechanism for feeding transverse rows of articles to the grading apparatus, and the plane of the view is indicated by the line 4—4 in FIG. 2a;

Figure 1:
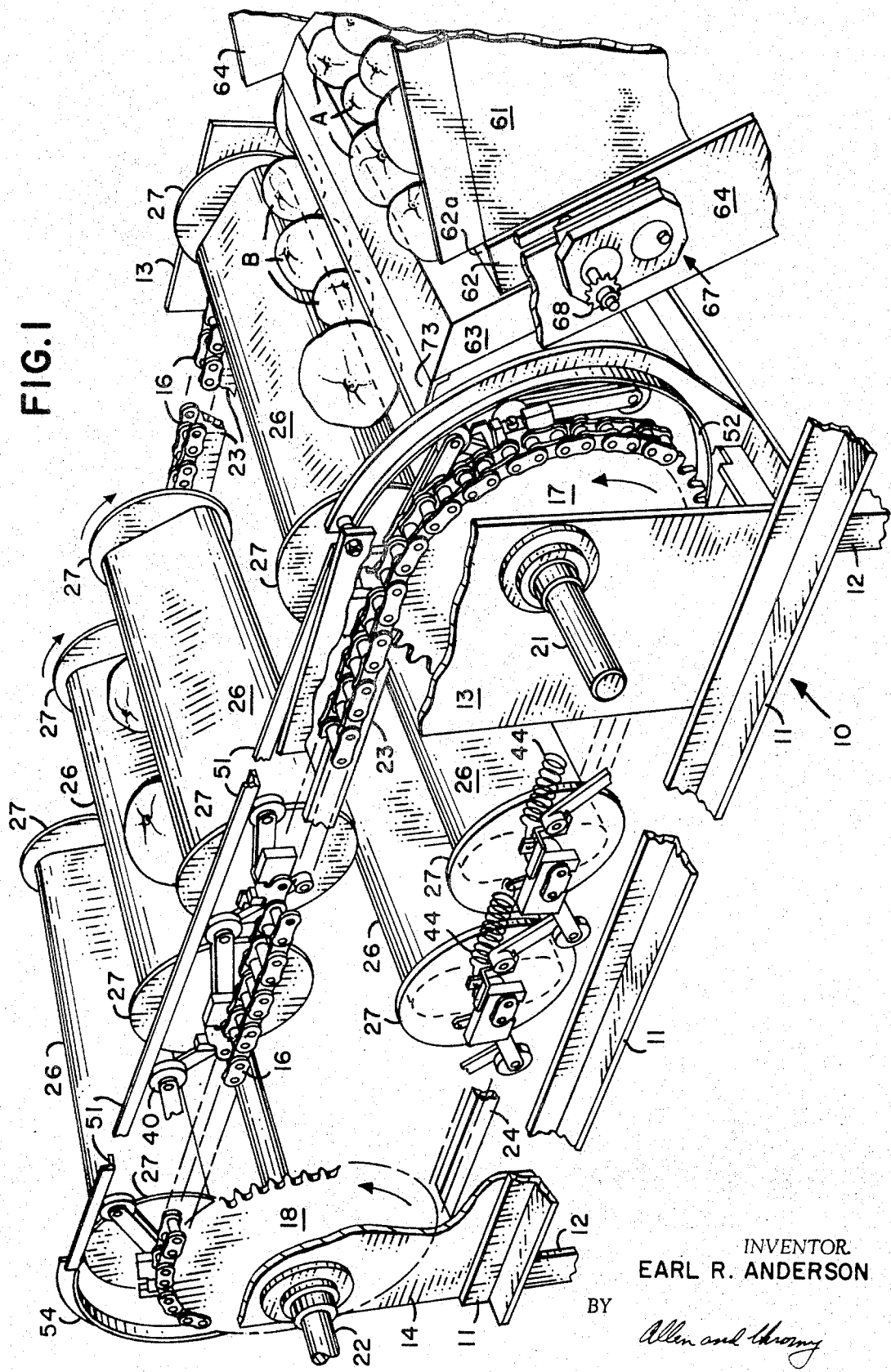
Figure 2A:
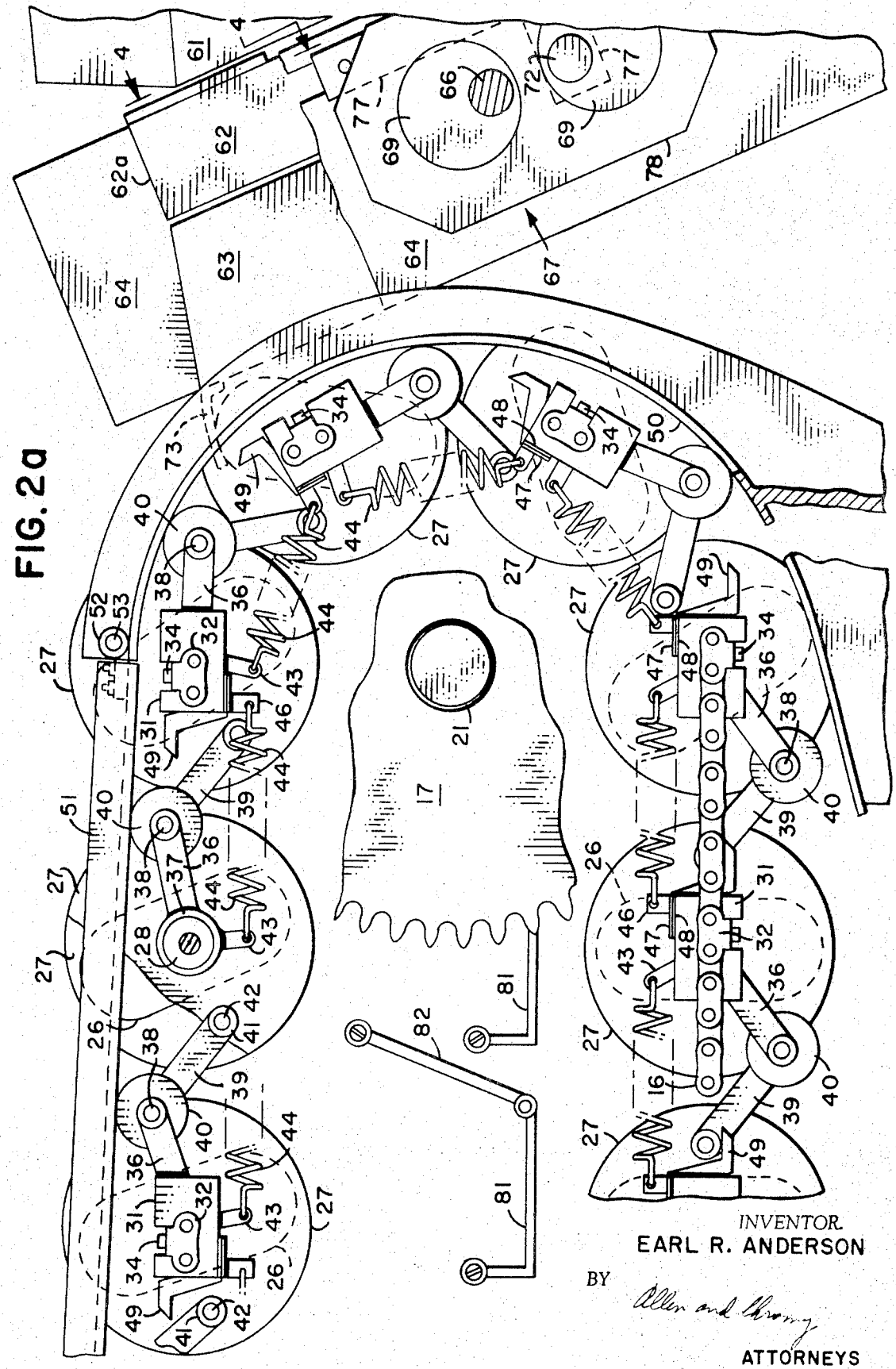

Referring to FIGS. 1, 2 and 2a, the grading machine comprises a frame 10 which includes side rails 11 and legs 12. Respective pairs of side plates 13 and 14 are mounted on side rails 11. The apparatus includes a pair of conveyor chains 16 which are trained about respective idler sprockets 17 and driving sprockets 18 mounted respectively on shafts 21 and 22 in the respective pairs of side plates 13 and 14. The shaft 22 is driven from a suitable source of power (not shown). The upper stretches of the chains 16 are supported by suitable guide rails 23 along their grading path so as to maintain a straight line movement of the chains thereover. The guide rails 23 are suitably supported on the respective side rails 11 in a manner not shown. The lower stretches of the chains 16 are supported by similar guide rails 24 (FIG. 1).

Figure 3:
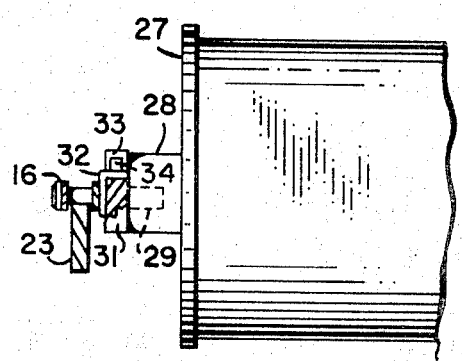
FIG. 3 is a transverse sectional view illustrating a grading element and its mounting and taken as indicated by the line 3—3 in FIG. 2.

An endless series of grading elements 26 (FIGS. 1, 2, 2a and 3) are provided having circular plates 27 secured to the ends thereof, and these plates 27 have respective hubs 28 with suitable bearings therein to receive pivotally respective mounting stub shafts 29 secured in respective carrier blocks 31. Each block 31 is fastened to the adjacent chain 16 by means of an angle extension or bracket 32 forming a part of a chain link in a conventional manner. Each angle extension 32 is received in a recess 33 of the carrier block 31 and secured therein by means of a set screw 34 (FIGS. 2a and 3). The angle brackets 32 on the chain are provided at equally spaced intervals therealong as required to carry the respective grading elements 26 pivotally mounted in the carrier blocks 31, the axes of the pivot shafts 29 being aligned with each other and symmetrically located with respect to both the side and end walls of the grading element.

Each grading element 26 (FIG. 2) is provided with straight opposite parallel side surfaces 26a, and the opposite side surfaces 26a are joined by arcuate end surfaces 27 which merge smoothly with the respective side surfaces 26a.

A spring-urged linkage is provided for controlling the relatively adjusted pivotal position of each of the grading elements 26 and this linkage is in the form of a toggle linkage comprising a link 36 (FIG. 2a) which is provided with a supporting sleeve 37 at one end disposed about and pivoted on the hub 28 of the adjacent grading element 26. Each link 36 comprises a pair of arms and its other end carries a pivot pin 38 in the center axis of this toggle linkage. A roller 40 whose function is described hereinafter is journaled on the pin 38. The second link 39 of the toggle linkage is pivotally connected to the pin 38 and at its opposite end has a hub 41 pivoted about a pin 42 carried by the circular plate 27 of the grading element to be adjusted by the toggle linkage. The plate 27 forms a lever arm extending at right angles to the parallel sides of the grading element 26 and centrally disposed with respect thereto. The sleeve 37 for each toggle arm 36 carries an ear 43 in which one end of a tension spring 44 is connected, the other end of this spring being connected to an ear 46 of a spring plate 47 secured to the block 31 by a suitable cap screw. This plate 47 abuts a second support plate 48 for an offset stop hook 49 which forms a stop for the hub 41 of the lever 39 when the roller 40 is not engaged by a cam as along the lower stretch of the travel of the grading elements as seen in FIGS. 2 and 2a, for example.

Each roller 40 (FIGS. 2 and 2a) is forced upwardly by the associated spring 44 to engage a common cam track 51 which carries at its one end a pivot bracket 52 engaging a shaft 53 carried by a frame plate 13 of the machine at the entrance end of the grading elements 26 as they start their grading travel. This cam track 51 is a continuation of an arcuate lead-in track 50 which is supported in fixed position on the frame, and, as seen in FIG. 2a, is engaged by the rollers 40 as the grading elements 26 start their upward travel around the feed end of the apparatus. At the discharge end of the machine, the cam track 51 carries a pivot bracket 52a supported on a transverse shaft 53a (FIGS. 2 and 3) and this shaft 53a is carried on a vertical adjustable slide 54 (FIG 3) which has a slot 56 engaged by a clamping screw 57 supported in one of the plates 14 of the frame of the machine.

It will be seen, therefore, that by elevating the end of the cam track 51 at the discharge end of the machine, the amount of pivoting movement given to each grading element 26 through its toggle linkage 36, 39 will be varied gradually as its idler 40 travels up the cam track 51, and it will also be noted that the adjusted pivoted position of each grading element 26 is held under the influence of its associated spring 44.

At the discharge end of the grading machine the shaft 53a also supports the end of a curved T cross section guide rail 54 for engagement by the rollers 40 to control these rollers as they approach the lower return stretch at the bottom of FIGS. 2 and 2a where they are released from control until they again re-enter the feed in cam track 50.

Figure 4:
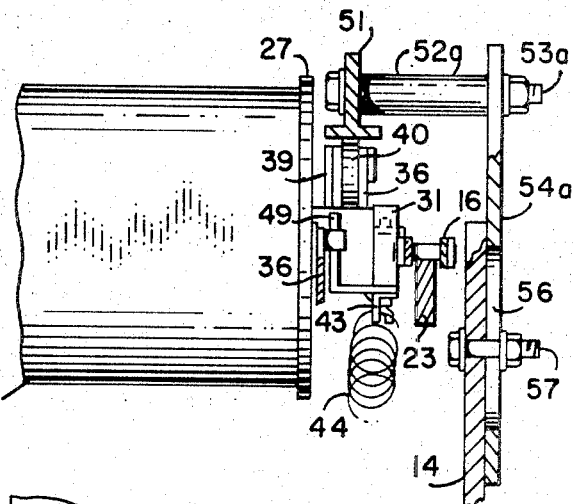
Figure 4:
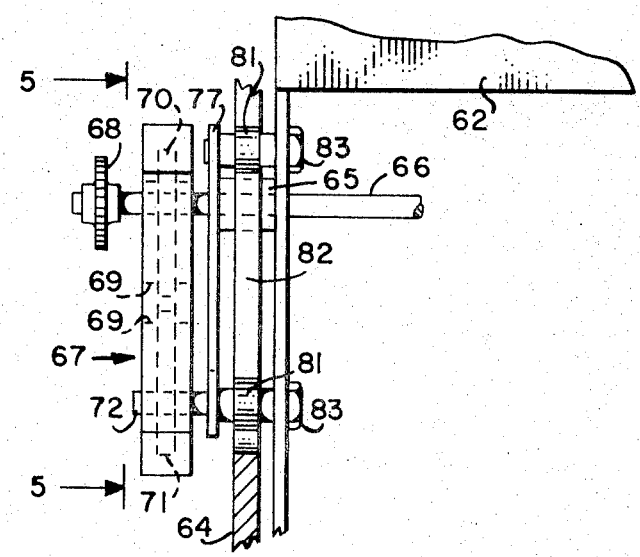
Figure 5:
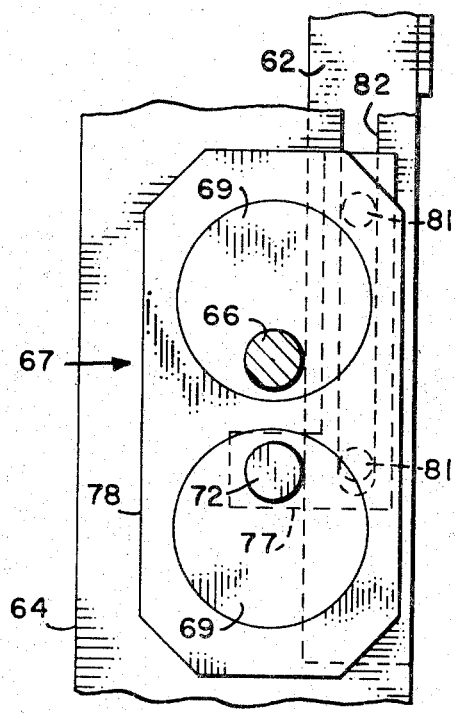
FIG. 5 is a side elevational view of the shuffle feed actuating means partially in section being taken in a plane indicated by the line 5—5 in FIG. 4.
Figure 7:
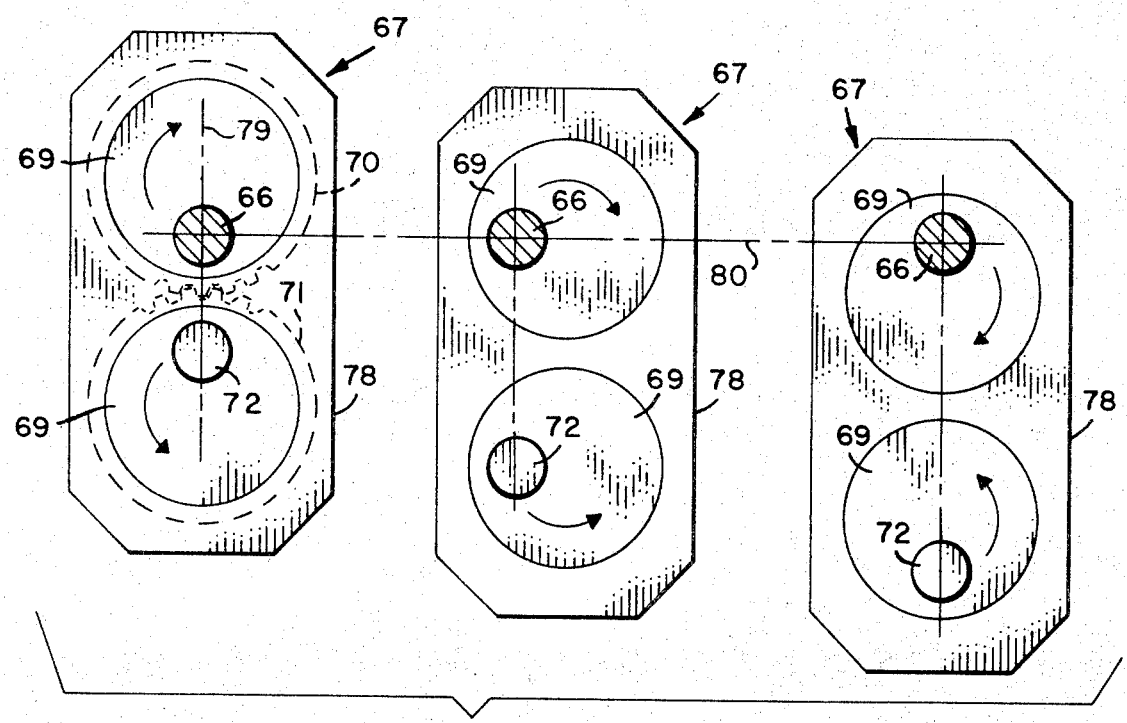

Preferably, the articles to be graded are fed row-by-row to the troughs formed by the adjacent grading elements 26, and this input feed mechanism comprises an inclined feed chute 61 (FIGS. 1 and 2a), which, for example, may communicate with the usual type of feed conveyor, such as a merry-go-round, for example. This feed chute 61 leads to a movable shuffle member 62 which serves to lift a row of articles from the position shown at A in FIG. 1 to the downwardly inclined top of a stationary shuffle member 63 from which they roll into a position B in a trough formed between a pair of the ascending grading elements 26. As seen in FIGS. 1 and 2a, the gap between the stationary shuffle member 63 and an adjacent grading element 26 is bridged by a flexible flap 73 attached to the member 63 and projecting therefrom into the path of the grading elements 26. The stationary shuffle member 63 is suitably secured to and between a pair of opposite frame members 64 (FIGS. 1 and 4) and these frame members 64 provide journalling means 65 for a cross shaft 66 driven from the left side, as seen in FIG. 4, by means of a sprocket 68 from a suitable drive source, not shown. The cross shaft 66 drives a pair of drive units 67 to provide a harmonic reciprocation of the movable shuffle element 62 so that it slows down as it reaches its upper discharge point, speeds up during the intermediate portion of its travel and again slows down as it reaches and leaves its article receiving location. Each harmonic drive unit 67 (FIG. 7) comprises a casing 78 in one face of which a pair of eccentric bearings 69 is journalled for a pair of eccentric gears 70 and 71. The gear 70 has a driving connection with the drive shaft 66 and the gear 71 with a lower aligning shaft 72. The result of the drive from the shaft 66 and the eccentric bearings 69 for the shaft 66 and the shaft 72 is a straight line reciprocating movement of the shaft 72 along a line intersecting its axis and the axis of the shaft 66 with true straight line harmonic motion. This reciprocating movement of the shaft 72 is compound in that the shaft 72 moves bodily with the housing 78, and because of the drive of its eccentric bearing, the shaft 72 also moves with respect to the housing 78. There is also a translatory reciprocating movement of the housing 78 with both vertical and horizontal components of movement. The respective movements of the various parts can be seen in FIG. 7 where the vertical and horizontal center lines 79, 80 of the fixed axis shaft 66 are shown. The shaft 72 externally of the housing 78 is pivotally engaged with the horizontal arm of an angle shaped link 77. The angular shaped link 77 (FIGS. 4 and 5) carries a pair of vertically aligned studs 81 which are guided in vertical slots 82 of the adjacent frame plate 64 and carry supporting links 83 for the movable shuffle member 62. As seen in FIG. 4 the studs 81 are axially aligned with aligning shaft 72 for the associated harmonic drive unit 67.

The effect of the above operation is to give a straight line movement to the slide 62 with its movement accelerating until the middle of its stroke, and then decelerating as it approaches its discharge end or feed end respectively.

Figure 6:
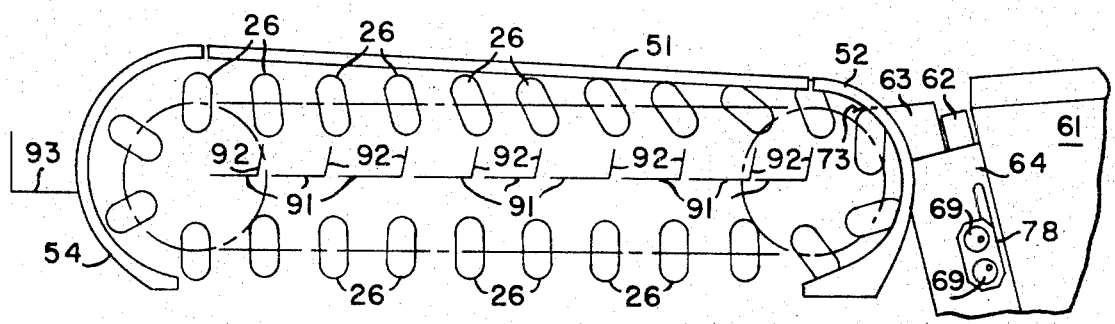
FIG. 6 is a schematic view illustrating the operation of the endless series of grading elements as they travel through their grading path.

To briefly summarize the operation of the machine, and referring to FIGS. 1 and 6, the articles to be graded, such as a field run of peaches for example, are fed down the chute 61 in bulk and in random position. As seen in FIG. 1, a row of these articles will roll onto the movable shuffle feed member 62 when it is in its "down" position as shown in FIG. 1. The angle to the horizontal of the upper surface 62a and the width of this upper surface are so selected that they will elevate from the largest to the smallest of the field run of fruit as a row. Upon elevation of this movable shuffle member 62, as seen for example in FIG. 6, a row of articles is discharged over the inclined top surface of the stationary shuffle member 63, over the flexible transfer flap 73 and into one of the troughs formed by an adjacent pair of the sizing elements 26. The operation of the shuffle feed member 62 is in timed relation to the movement of the grading elements 26 so that as each trough between a pair of these elements 26 presents itself in proper position it receives a row of fruit discharged by movable shuffle member 62. The relative adjustment of grading elements 26 forming the trough is such that they will perform no grading action when a row of fruit is received.

The respective adjacent pairs of grading or sizing elements 26 with a row of articles such as peaches, for example, supported in each trough between each adjacent pair of the sizing elements 26 moves to the left across the top of the stretch and gradually the sizing openings therebetween increase in width to cause the fruit of the correct size range to drop through onto the associated trough 91. The discharge troughs 81 are provided preferably with an adjustable divider 92 which can be set to the appropriate position so that articles of a given size range will fall through into the desired trough 91. The troughs 91 may be either inclined for gravity discharge of the articles or be provided with a belt for a power discharge of the articles. The various sizes are collected as the articles pass across on the sizing elements, and as seen in the drawing, the angularity of these elements are gradually changed until they are substantially parallel at the discharge end, when everything but the largest size will have fallen through into the series of troughs 91 and this larger size will be discharged over the end into the trough 93.

It will be noted that the sizing elements provide only smooth or rounded contours for contact with the articles to eliminate the possibility of bruising, and are held by a spring at the size opening so that there is no tendency to force an article to be wedged therebetween and an effective sizing operation can be performed with the number of sizes required. Because the adjustment of the control cam 51 for the various rollers can be selected to give the number of desired sizes by its rate of rise it is apparent that the sizing equipment is easily adjustable to vary the particular sizing desired with a field run of the articles being sized.

While I have shown and described a certain preferred embodiment of the invention it is apparent that the invention is capable of variation and modification from the form shown so that the scope thereof should be limited only by the proper scope of the claims appended hereto.

I claim:

1. In a grading machine for articles such as fruits and vegetables, a frame, a pair of parallel transversely disposed grading elements having rounded end surfaces, means mounting said grading elements on the frame for relative adjusting movement about transverse pivotal axes each disposed substantially equal distances from and intermediate said rounded end surfaces of said element with respect to each other while moving through a grading path, each grading element having smooth sides of similar contour and joined by said rounded end surfaces, one of said end surfaces being disposed at the top while in said grading path, said pair of grading elements providing a transverse grading opening for a row of articles defined by one of said rounded end surfaces and by a surface of an adjacent element, and said surfaces diverging both upwardly and downwardly from said grading opening, and control means for effecting relative movement of said grading elements to determine the width of the grading opening therebetween.

2. In a grading machine as recited in claim 1 in which said control means comprise a cam surface extending lengthwise of the grading machine and control means spring-urged against said cam means to control the rotated positions of said grading elements and thereby the size of the grading opening as it moves along said path.

3. In a grading machine as recited in claim 1 in which said control means comprises a motion multiplying linkage for rotating each of said grading elements and thereby controlling the effective width of the grading slot, and cam means for operating said motion multiplying linkage.

4. In a grading machine for articles such as fruit and vegetables, a frame, a conveyor mounted on said frame comprising an endless series of similar parallel grading elements carried by said conveyor in transversely disposed relation thereto, means for driving said conveyor to effect travel of said grading elements along a grading path, means including a pair of adjacent grading elements providing a transverse grading slot or opening therebetween, means providing an adjustable mounting for each of said elements on said conveyor, each element having similar smooth side walls joined by end surfaces, control means individual to each element for determining the adjustment thereof including a cam follower, said grading elements having pivotal mounting means substantially midway between their ends providing their adjustable mounting on said conveyor, and cam means mounted on said frame for engagement by said cam followers.

* * * * *